United States Patent
Yano

(10) Patent No.: US 9,239,976 B2
(45) Date of Patent: Jan. 19, 2016

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Takaaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/132,657

(22) Filed: Dec. 18, 2013

(65) Prior Publication Data

US 2014/0176969 A1 Jun. 26, 2014

(30) Foreign Application Priority Data

Dec. 20, 2012 (JP) ................................ 2012-278322

(51) Int. Cl.
 *H04N 1/40* (2006.01)
 *G06K 15/00* (2006.01)
 *G06K 15/02* (2006.01)

(52) U.S. Cl.
 CPC ........ *G06K 15/4065* (2013.01); *G06K 15/1868* (2013.01); *G06K 15/002* (2013.01)

(58) Field of Classification Search
 CPC .................. H04N 1/00278; H04N 2201/0082; H04N 2201/0074; H04N 1/0074; H04N 1/00482; H04N 2201/3242; H04N 2201/3274; H04N 2201/33314; H04N 1/00724; H04N 2201/0094; H04N 1/00087; H04N 1/00082; H04N 1/00167
 USPC ............... 358/1.9, 1.13, 518, 448, 3.23, 3.26, 358/1.16, 406, 504
 See application file for complete search history.

(56) References Cited

U.S. PATENT DOCUMENTS

| | | | |
|---|---|---|---|
| 6,752,548 B2 * | 6/2004 | Azami | 400/76 |
| 6,831,756 B1 * | 12/2004 | Ushiroda | 358/1.9 |
| 7,268,897 B1 * | 9/2007 | Moro et al. | 358/1.13 |
| 7,630,094 B2 * | 12/2009 | Kitahara et al. | 358/1.15 |
| 7,893,962 B2 * | 2/2011 | Endo et al. | 348/207.2 |

FOREIGN PATENT DOCUMENTS

| | | | |
|---|---|---|---|
| JP | 2010213260 A | * | 9/2010 |
| JP | 2011-43815 A | | 3/2011 |

* cited by examiner

*Primary Examiner* — Thomas D Lee
*Assistant Examiner* — Stephen M Brinich
(74) *Attorney, Agent, or Firm* — Canon USA, Inc. IP Division

(57) ABSTRACT

An image processing apparatus includes an acquisition unit configured to acquire a paper type to be used at the time of execution of an input print job, a determination unit configured to determine a paper type to be used for executing the input print job by using information about the paper type acquired by the acquisition unit, and a generation unit configured to generate a correction table corresponding to the paper type determined by the determination unit, the correction table being used to correct an image that is formed by an image forming unit by using a value obtained as a result of measuring a patch formed by the image forming unit on paper of the paper type determined by the determination unit.

9 Claims, 21 Drawing Sheets

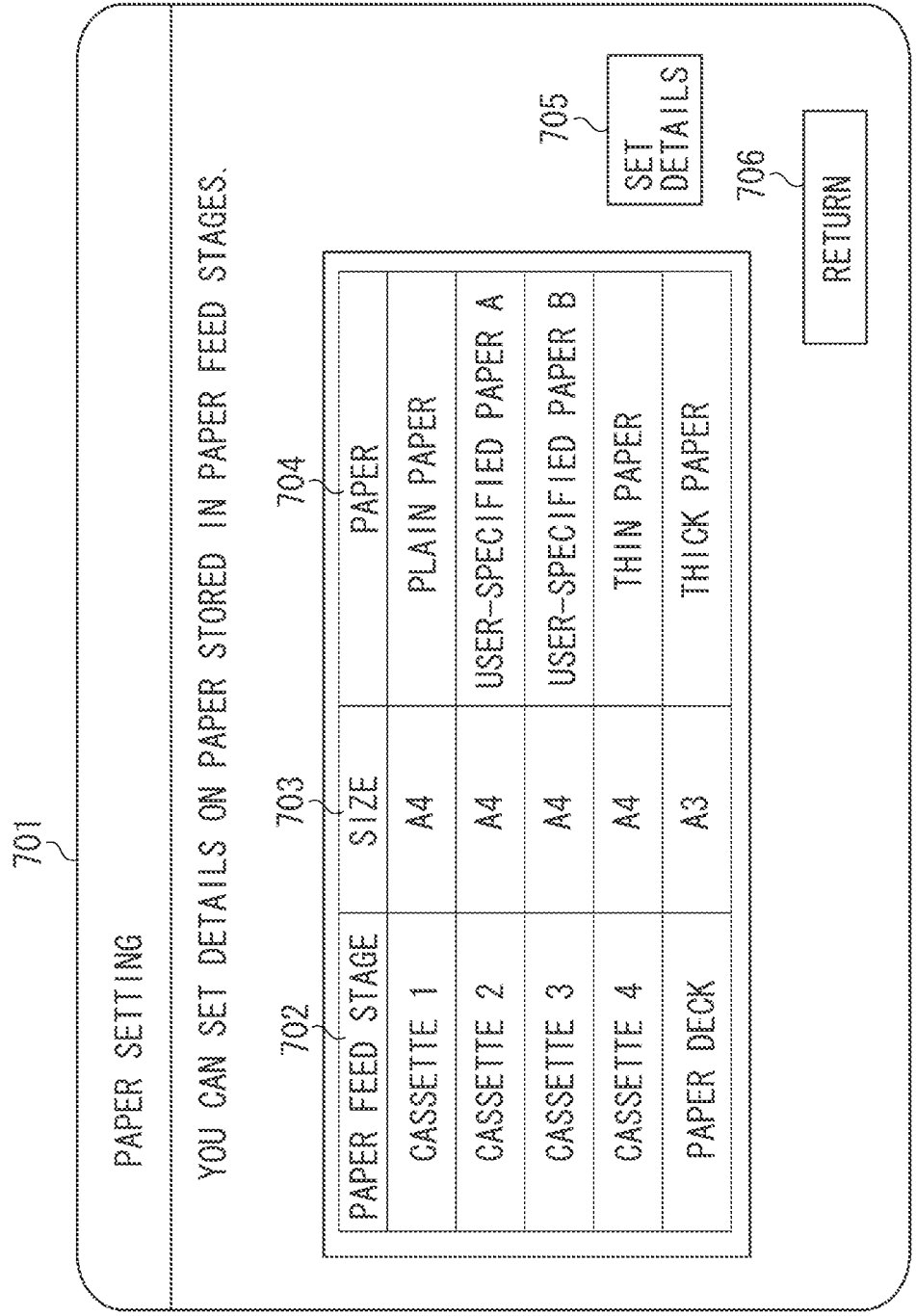

FIG. 8

CALIBRATION PAPER REGISTRATION — 801

YOU CAN REGISTER CALIBRATION PAPER.

REGISTERED PAPER LIST — 802

| PAPER | DATE OF REGISTRATION — 803 |
|---|---|
| STANDARD PLAIN PAPER | AT THE TIME OF SHIPMENT (UNMODIFIABLE) |
| STANDARD COATED PAPER | AT THE TIME OF SHIPMENT (UNMODIFIABLE) |
| STANDARD THICK PAPER | AT THE TIME OF SHIPMENT (UNMODIFIABLE) |
| USER-SPECIFIED PAPER B | 14:00 OCT. 2, 2012 |
| USER-SPECIFIED PAPER C | 9:00 OCT. 15, 2012 |

804 — ADD PAPER TO BE REGISTERED

805 — RETURN

FIG. 9

CALIBRATION SETTING — 901

SELECT A PAPER FEED STAGE SUBJECTED TO CALIBRATION, AND PRESS OK BUTTON.
TO AUTOMATICALLY SELECT CALIBRATION, PRESS "SELECT AUTOMATICALLY" BUTTON.
TO REGISTER NEW CALIBRATION PAPER, PRESS "REGISTER PAPER" BUTTON.

| PAPER FEED STAGE | PAPER | REGISTERED |
|---|---|---|
| CASSETTE 1 | A4 PLAIN PAPER | O |
| CASSETTE 2 | A4 USER-SPECIFIED PAPER A | |
| CASSETTE 3 | A4 USER-SPECIFIED PAPER B | O |
| CASSETTE 4 | A4 COATED PAPER | O |
| PAPER DECK | A3 THICK PAPER | O |

902  903  904  905

906 — SELECT AUTOMATICALLY

907 — REGISTER PAPER

908 — EXECUTE

909 — CANCEL

FIG. 10

CALIBRATION EXECUTION — 1001

CALIBRATION WILL BE EXECUTED IN ORDER OF THE FOLLOWING COMBINATIONS. IF YOU WILL EXECUTE CALIBRATION WITH THE FOLLOWING COMBINATIONS, PRESS "EXECUTE" BUTTON.
TO CHANGE THE ORDER, OPERATE THE BUTTONS AT RIGHT.

| NO | PAPER | PAPER FEED STAGE | JOB |
|---|---|---|---|
| 1 | A4 PLAIN PAPER | CASSETTE 1 | 1 |
| 2 | A4 USER-SPECIFIED PAPER B | CASSETTE 3 | 3 |
| | | | |

1002 1003 — 1004 — 1005 — 1006

- UP — 1007
- DOWN — 1008
- DELETE — 1009
- EXECUTE — 1010
- CANCEL — 1011

FIG. 17

| JOB | PAPER | PAPER FEED STAGE | REGISTERED | MESSAGE |
|---|---|---|---|---|
| 2 | USER-SPECIFIED PAPER A | CASSETTE 2 | UNREGISTERED | REGISTER CALIBRATION PAPER. |
| 4 | USER-SPECIFIED PAPER C | UNSET | ○ | SUPPLY PAPER TO PAPER FEED STAGE, AND SET DETAILS ON PAPER. |

FIG. 19

| PAPER | DATE OF REGISTRATION | DATE OF EXECUTION | CALIBRATION TIME (REFERENCE) |
|---|---|---|---|
| STANDARD PLAIN PAPER | AT THE TIME OF SHIPMENT (UNMODIFIABLE) | 10:15 OCT. 24, 2012 | 3 MINUTES |
| STANDARD COATED PAPER | AT THE TIME OF SHIPMENT (UNMODIFIABLE) | 13:50 OCT. 3, 2012 | 20 MINUTES |
| STANDARD THICK PAPER | AT THE TIME OF SHIPMENT (UNMODIFIABLE) | 10:05 SEP. 20, 2012 | 15 MINUTES |
| USER-SPECIFIED PAPER B | 14:00 OCT. 2, 2012 | 10:30 OCT. 24, 2012 | 5 MINUTES |
| USER-SPECIFIED PAPER C | 9:00 OCT. 15, 2012 | UNKNOWN (UNEXECUTED) | 8 MINUTES |

| NO 2101 | PAPER 2102 | PAPER FEED STAGE 2103 | JOB 2104 | EXECUTION TIMING 2105 | |
|---|---|---|---|---|---|
| | | | | PROMPTLY 2106 | IMMEDIATELY BEFORE JOB 2107 |
| 1 | A4 PLAIN PAPER | CASSETTE 1 | 1 | ○ | |
| 2 | A4 USER-SPECIFIED PAPER A | CASSETTE 2 | 2 | ○ | |
| – | A4 USER-SPECIFIED PAPER B | CASSETTE 3 | 3 | | ○ |
| | | | | | |

IMAGE PROCESSING APPARATUS, IMAGE PROCESSING METHOD, AND PROGRAM

BACKGROUND OF THE INVENTION

1. Field of the Invention

The present invention relates to an image processing apparatus for correcting the color of an image that is output from a printer, an image processing method therefor, and a program for generating image processing parameters.

2. Description of the Related Art

With the improved performance of image forming apparatuses in recent years, some image forming apparatuses have achieved an image quality equivalent to that of printing machines. However, the printing characteristics of an image forming apparatus are known to be changed by the influence of the installation environment. There has been a problem in that the temperature or humidity in the installation environment and the aging of the apparatus and parts replacement change the density and tint at the time of printing, and a stable print product cannot be obtained.

To solve this problem, an image forming apparatus generally employs a calibration technique so that a stable print product is output. The calibration technique is a technique for correcting the gradation characteristics of toner used for printing. The technique prints some patches having different gradations with known toner amounts, and measures the density of these patterns by using a scanner or a sensor connected to the image forming apparatus. The technique generates a correction look-up table (LUT) so that the result of the measurement coincides with a known target density. Applying the generated correction LUT at the time of printing enables obtaining a stable output suitable for the target density characteristics.

In addition to the above-described factors of the image forming apparatus, the change in the printing characteristics is greatly affected by the characteristics of paper used for printing. There are various types of paper used for printing, which differ in size, grammage, surface property, and paper chromaticity. Even with the same characteristics of the image forming apparatus, different paper characteristics (paper type) used for printing will cause different reproduction characteristics of the result of printing. Therefore, the image forming apparatus prepares a target value for each paper type, and performs calibration for correcting the reproduction characteristics so that the output value coincides with the target value, and stores a correction LUT generated each time calibration is executed. By performing calibration in this way, the image forming apparatus reduces the influence of the difference in paper (paper type) on the reproduction characteristics. In calibration, the image forming apparatus applies the correction LUT generated by using a suitable target value for each paper (paper type) used at the time of printing. A combination of a specific type of paper (paper type) and a target value corresponding to the paper is referred to as a calibration set.

Generally, the image forming apparatus has a plurality of paper feed stages for simultaneously storing various types of paper. The plurality of paper feed stages is able to store paper classified into different paper types. Suitable paper is fed according to settings at the time of print job execution, and then printing is performed. As described above, the paper type and the output characteristics are closely related with each other.

Japanese Patent Application Laid-Open No. 2011-43815 discusses a technique for presenting, at the time of calibration execution, which paper feed stage stores paper of a paper type to be used at the time of calibration execution.

However, the prior art technique determines, at the time of calibration execution, whether paper of a paper type involving the generation of a correspondent correction table is stored in the apparatus, and presents whether calibration can be executed. Therefore, a user needs to select a paper type involving the generation of a correspondent correction table through the calibration execution.

Further, if calibration for generating a correction table is executed on all of paper types having a target value setting before printing, the processing may take a very long time. Further, if calibration is executed on all of paper types having a target value setting, consumables such as toner and paper may be uselessly consumed.

SUMMARY OF THE INVENTION

According to an aspect of the present invention, an image processing apparatus includes an acquisition unit configured to acquire a paper type to be used at the time of execution of an input print job, a determination unit configured to determine a paper type to be used for executing the input print job by using information about the paper type acquired by the acquisition unit, and a generation unit configured to generate a correction table corresponding to the paper type determined by the determination unit, the correction table being used to correct an image that is formed by an image forming unit by using a value obtained as a result of measuring a patch formed by the image forming unit on paper of the paper type determined by the determination unit.

According to exemplary embodiments of the present invention, it is feasible, at the time of calibration execution, to acquire information about a paper type to be used for execution of an input print job, and execute calibration on a paper type requiring the generation of a correction LUT.

Thus, before the print job is executed, calibration can be selectively executed on a paper type requiring the generation of a correction LUT. Thus, useless consumption at the time of calibration execution can be reduced.

Further features of the present invention will become apparent from the following description of exemplary embodiments with reference to the attached drawings.

BRIEF DESCRIPTION OF THE DRAWINGS

FIG. 7 illustrates a UI of a paper setting screen according to the first exemplary embodiment.

FIG. 8 illustrates a UI of a calibration paper registration screen according to the first exemplary embodiment.

FIG. 9 illustrates a UI of a calibration setting screen according to the first exemplary embodiment.

FIG. 10 illustrates a UI of a calibration execution screen according to the first exemplary embodiment.

FIG. 17 illustrates a list of calibration sets for which calibration cannot be executed according to a second exemplary embodiment.

FIG. 19 illustrates calibration paper registration information according to the third exemplary embodiment.

FIG. 21 illustrates a UI of a calibration execution list according to a fourth exemplary embodiment.

DESCRIPTION OF THE EMBODIMENTS

Various exemplary embodiments, features, and aspects of the invention will be described in detail below with reference to the drawings.

In a first exemplary embodiment, a correction table is generated, before performing printing, for the type of paper (paper type) to be used at the time of execution of an input print job. When executing a plurality of print jobs, the present exemplary embodiment generates a calibration table corresponding to each paper type to be used by each of the plurality of print jobs.

Figure 1:
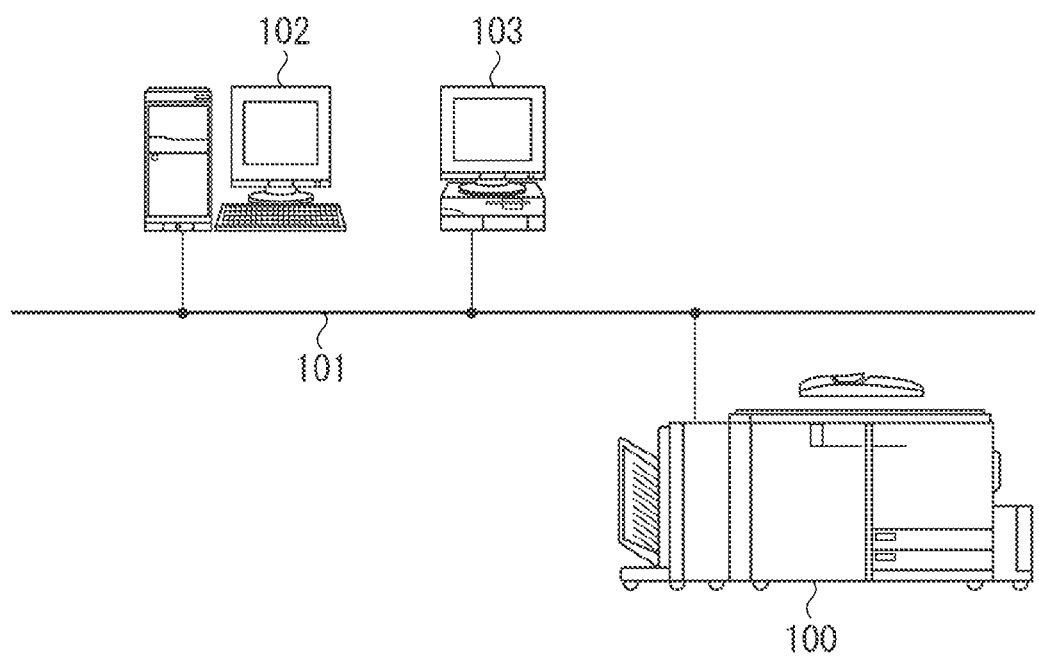
FIG. 1 illustrates a connection environment of a printing system according to exemplary embodiments of the present invention.

FIG. 1 illustrates an example of a connection environment of a printing system according to the present exemplary embodiment. In the present exemplary embodiment, an image processing apparatus 100, a print server 102, and a client personal computer (PC) 103 are connected via a network line 101. In this system, the print server 102 inputs, generates, and manages print jobs, and sequentially transmits them to the image processing apparatus 100 via the network line 101. Further, the image processing apparatus 100 performs required processing on a received print job, and prints it out onto actual paper. A print job is input, for example, from client PC 103 connected on the same network 101 to the print server 102 via a print driver (not illustrated) or through a user operation on an application graphical user interface (GUI) for the print server 102.

Figure 2:
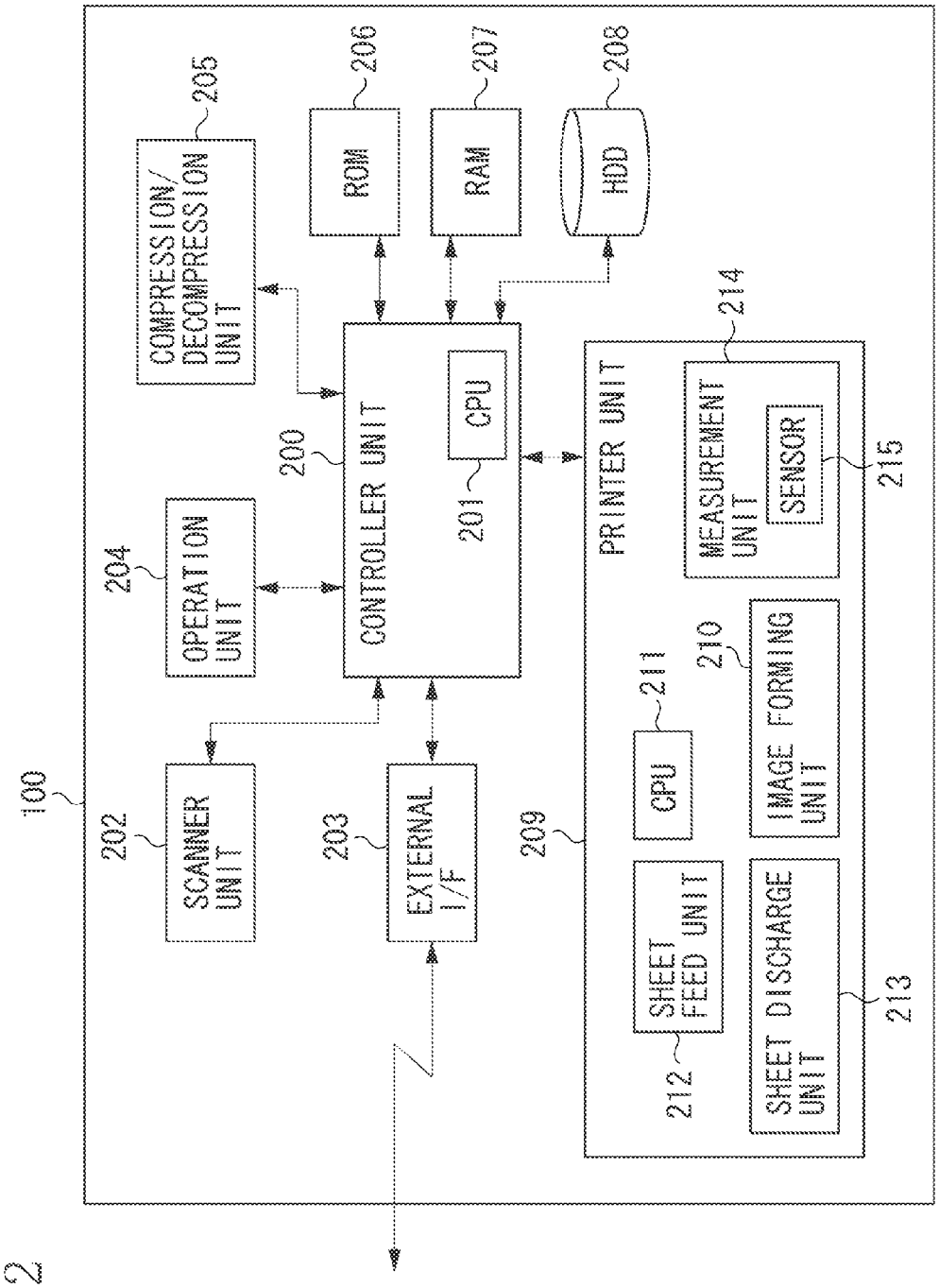
FIG. 2 illustrates a hardware module configuration of an image processing apparatus according to a first exemplary embodiment.

FIG. 2 is a block diagram illustrating an example of a hardware configuration of the image processing apparatus 100 according to the present exemplary embodiment. The image processing apparatus 100 includes a controller unit 200 including a central processing unit (CPU) 201, a scanner unit 202, an external interface (I/F) 203, an operation unit 204, a compression/decompression unit 205, a read-only memory (ROM) 206, a random access memory (RAM) 207, a hard disk drive (HDD) 208, and a printer unit 209. Various control programs to be controlled by the controller unit 200 are stored in the ROM 206, loaded into the RAM 207 as required, and controlled and executed by the CPU 201. The printer unit 209 includes an image forming unit 210, a CPU 211, a sheet feed unit 212, a sheet discharge unit 213, a measurement unit 214, and a sensor 215.

Figure 3:
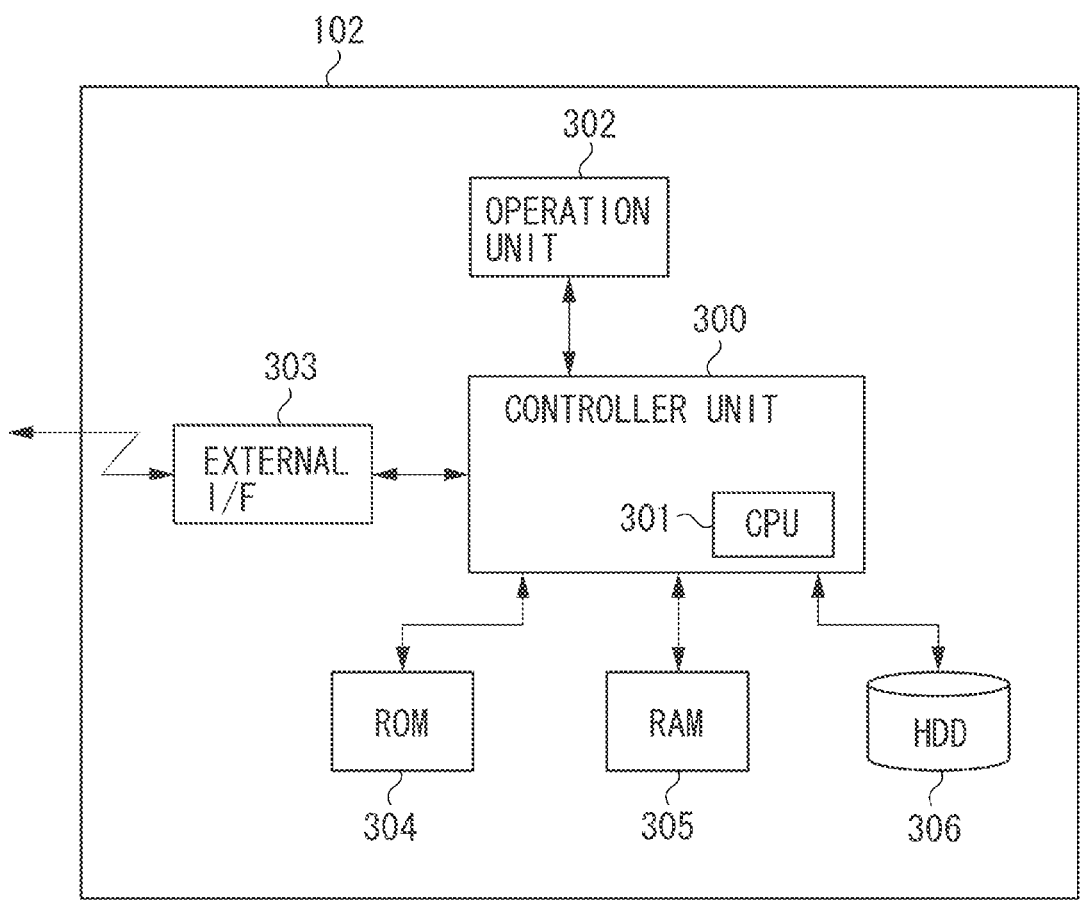
FIG. 3 illustrates a hardware module configuration of a print server according to the first exemplary embodiment.

FIG. 3 is a block diagram illustrating an example of a hardware configuration of the print server 102 according to the present exemplary embodiment. The print server 102 includes a controller unit 300 including a CPU 301, an operation unit 302, an external I/F 303, a ROM 304, a RAM 305, and an HDD 306. Various control programs to be controlled by the controller unit 300 are stored in the ROM 304, loaded into the RAM 305 as required, and controlled and executed by the CPU 301.

Figure 4:
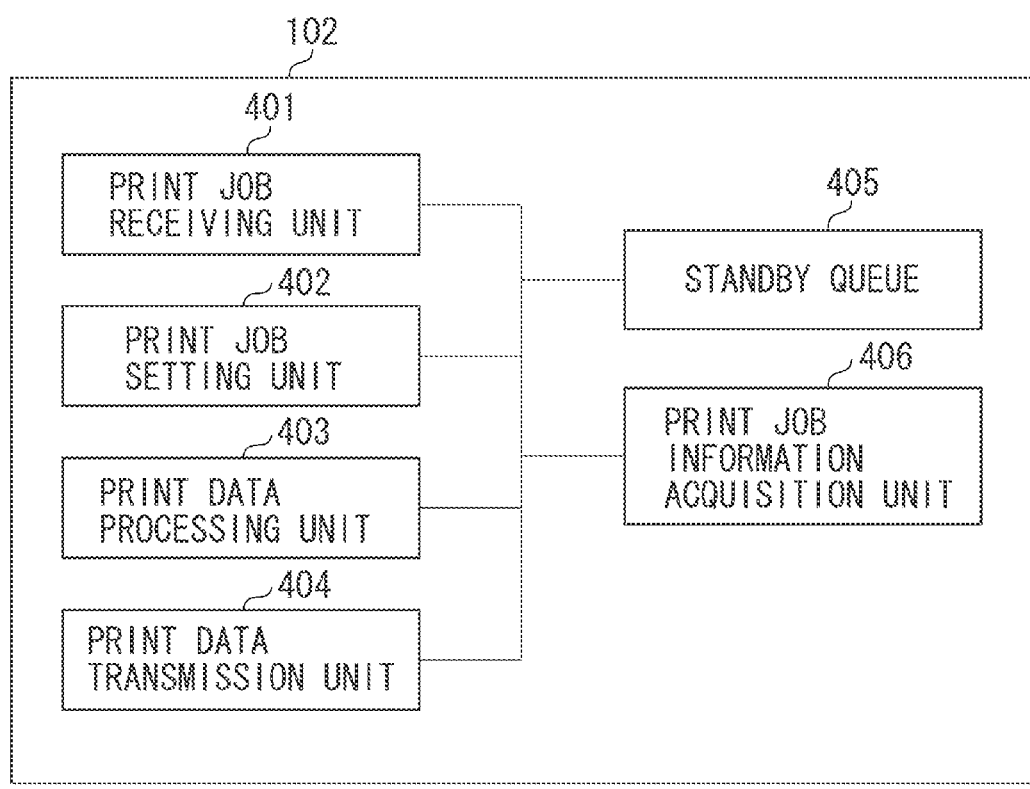
FIG. 4 illustrates a software module configuration of the print server according to the first exemplary embodiment.

FIG. 4 is a block diagram illustrating an example of a software module configuration of the print server 102 according to the present exemplary embodiment. The following describes print processing performed by the print server 102, with reference to FIG. 4.

A print job receiving unit 401 is processed by the CPU 301 included in the controller unit 300. The print job receiving unit 401 receives a print job input from the client PC 103 via the external I/F 303 or when the user performs an input operation on the operation unit 302, and stores the print job in the HDD 306. The HDD 306 for storing the received print job is referred to as a standby queue 405. The HDD 306 can store a plurality of print jobs.

A print job setting unit 402 is processed by the CPU 301. The print job setting unit 402 performs setting required for various print processing on print jobs stored in the standby queue 405. Specifically, the print job setting unit 402 further analyzes a print setting pre-attached to the received print job, performs print setting specified by the user via the operation unit 302, and stores in the standby queue 405 the print setting as print setting information together with the print job.

A print data processing unit 403 is processed by the CPU 301. The print data processing unit 403 reads a print job having print settings from the standby queue 405, performs processing according to various print settings, and performs raster image processing (RIP) on the print job to convert it into print data having a format printable by the image processing apparatus 100. The print data processing unit 403 stores the print data having undergone the RIP processing in the standby queue 405.

A print data transmission unit 404 is processed by the CPU 301. When the user performs a print execution operation via the operation unit 302, the print data transmission unit 404 reads the print data stored in the HDD 306, and transmits it to the image processing apparatus 100 via the external I/F 303. The print data is transmitted not only at a timing of user operation but also at a timing of a print schedule preset by the print job setting unit 402. Further, by specifying the plurality of print jobs stored in the standby queue 405, the print data transmission unit 404 may sequentially and continuously transmit print data.

A print job information acquisition unit 406 is processed by the CPU 301. The print job information acquisition unit 406 acquires print job information stored in the standby queue 405, and transmits it to the image processing apparatus 100.

Figure 5:
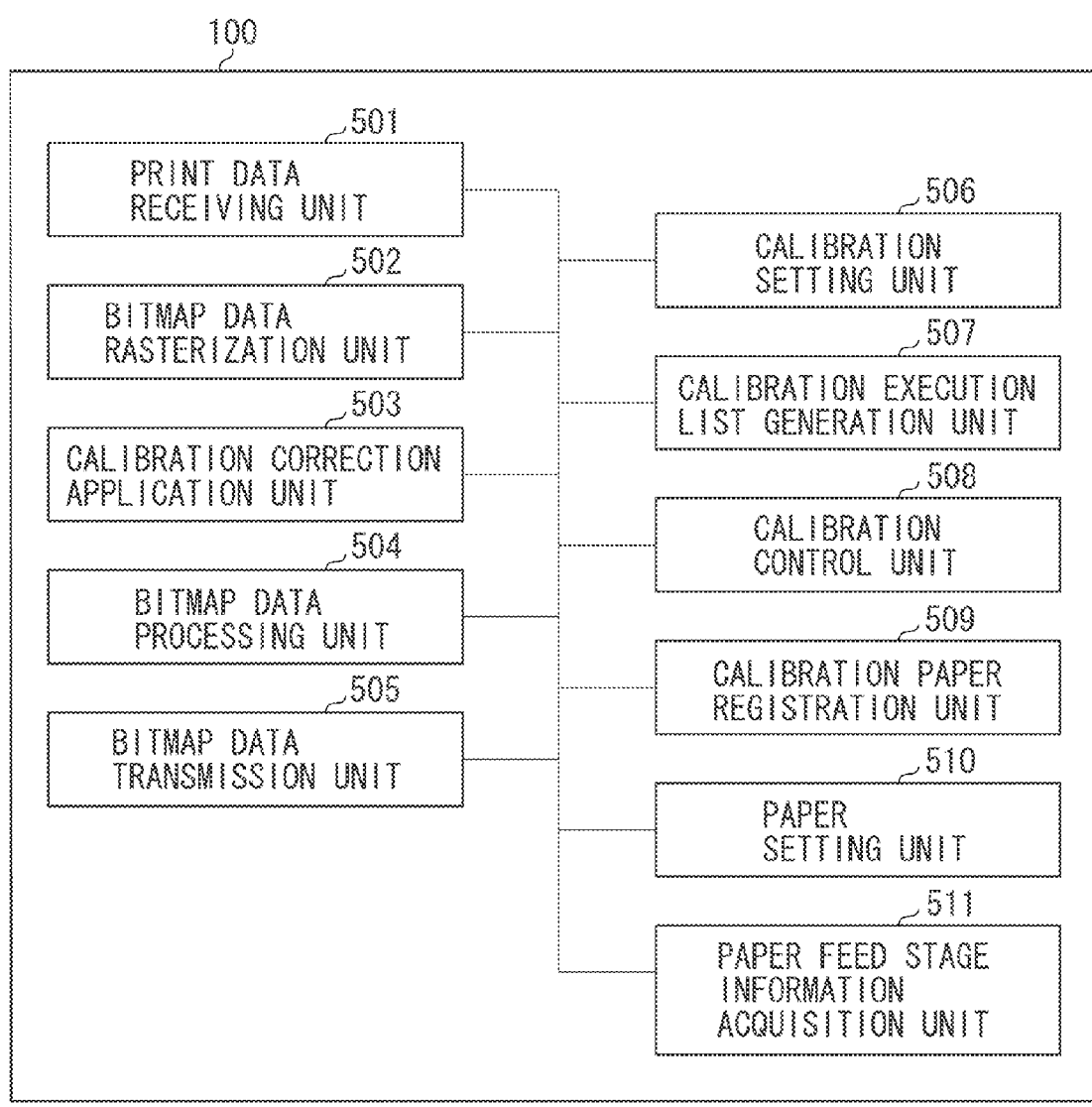
FIG. 5 illustrates a software module configuration of the image processing apparatus according to the first exemplary embodiment.

FIG. 5 is a block diagram illustrating an example of a software module configuration of the image processing apparatus 100 according to the present exemplary embodiment. The following describes print processing performed by the image processing apparatus 100, with reference to FIG. 5.

A print data receiving unit 501 is processed by the CPU 201. The print data receiving unit 501 receives print data transmitted from the print server 102 via the external I/F 203, and compresses the print data via the compression/decompression unit 205, and loads it into the RAM 207.

A bitmap data rasterization unit 502 is processed by the CPU 201. The bitmap data rasterization unit 502 decompresses via the compression/decompression unit 205 the print data loaded into the RAM 207 to rasterize it into bitmap data. For example, color data is regularly rasterized into four different types of bitmap data (C, M, Y, and K).

A calibration correction application unit 503 is processed by the CPU 201. The calibration correction application unit 503 performs correction processing on the rasterized bitmap data by using the correction table generated through the calibration execution. This processing absorbs and corrects engine fluctuations to constantly provide a stable output. Calibration processing will be described in detail below.

A bitmap data processing unit 504 is processed by the CPU 201. The bitmap data processing unit 504 converts the bitmap data corrected through calibration into data having a format readable by the printer unit 209. Generally, the image forming unit 210 included in the printer unit 209 is able to express a small number of gradations. Therefore, the bitmap data processing unit 504 performs what is generally called half-tone processing. In half-tone processing, the number of gradations of bitmap data is decreased to a value which can be represented by the image forming unit 210 to enable expressing multi-gradation in a pseudo way by using the half-tone technique.

The bitmap data transmission unit 505 is processed by the CPU 201. The bitmap data transmission unit 505 transmits the bitmap data having undergone the half-tone processing to the printer unit 209.

The CPU 211 performs print processing on the print data transmitted to the printer unit 209. The CPU 211 feeds paper set in the print data from the sheet feed unit 212, performs print processing on the paper via the image forming unit 210, and discharges the paper from the sheet discharge unit 213.

The following describes a workflow of the print processing assumed by the present exemplary embodiment. The present exemplary embodiment assumes the print on demand (POD) environment. In the POD environment, much print data is regularly input from many customers, printing management is performed by an administrator, and printing is sequentially performed by an operator. The administrator stores many print jobs in the standby queue 405 of the print server 102, performs necessary print setting, and continuously instructs print processing at one time. The operator actually performs print processing on the image processing apparatus 100. For example, the operator prepares paper required for printing and supplies it to the sheet feed unit 212, collects print products output to the sheet discharge unit 213 and transfers them to the following process, and executes calibration on the image processing apparatus 100 before printing execution.

Although the printing flow of one print job is as described above, the present exemplary embodiment provides a workflow effective in the calibration execution in a state where print jobs are stored in the standby queue 405 and a printing standby state occurs in the POD environment.

The following describes paper setting required for executing calibration processing. In paper setting, the user sets information about paper stored in the paper feed stages configured in the sheet feed unit 212. Paper setting processing is processed by the paper setting unit 510, and then executed by the CPU 201. FIG. 7 illustrates an example of a UI screen allowing the user to perform paper setting. The PAPER SETTING screen 701 is processed by the CPU 201. When the user presses a paper setting button on a main menu screen (not illustrated), the CPU 201 displays the PAPER SETTING screen 701 on the operation unit 204. The information displayed in this screen includes an item 702 indicating paper feed stages configured in the sheet feed unit 212 included in the image processing apparatus 100, an item 703 indicating the size of paper stored in each paper feed stage, and an item 704 indicating the paper type. When the user wants to store new paper in any paper feed stage or to change existing paper to another paper, the user performs operations on the UI screen. When the user selects any paper feed stage from the paper feed stage list 702 and then presses a SET DETAILS button 705, the screen changes to a setting screen (not illustrated) allowing the user to set a paper size and a paper type. The paper type refers to type information classified based on the grammage and surface property of the paper preset in the image processing apparatus 100 and stored in the HDD 208. At the time of print processing, the CPU 201 performs control to change for each paper type the behavior of the image forming unit 210 at the time of printing to provide an optimum output image quality for each paper type. The paper information set by the user is stored in the HDD 208 and acquired by a paper feed stage information acquisition unit 511 at any timing. When the user presses a RETURN button 706, the screen changes to the main menu screen. The paper feed stage information acquisition unit 511 is processed by the CPU 201 and the CPU 211. This processing is executed at any timing to acquire information about paper feed stages and paper set in each paper feed stage stored in the HDD 208. In the present exemplary embodiment, the calibration setting unit 506 performs this processing to acquire the paper feed stage information.

The following describes calibration paper registration required at the time of execution of calibration processing. Registration refers to storing any calibration paper information in the HDD 208. This processing is processed by the calibration paper registration unit 509, and then is executed by the CPU 201. FIG. 8 illustrates an example of a UI screen for performing calibration paper registration.

When the user presses a calibration paper registration button 605 in an ADJUSTMENT/CLEANING setting screen 601 (described below) or a REGISTER PAPER button 907 in a CALIBRATION SETTING screen 901, a CALIBRATION PAPER REGISTRATION screen 801 is displayed on the operation unit 204. The CALIBRATION PAPER REGISTRATION screen 801 displays a list of registered paper enabling the calibration execution. Items displayed in this list include, for example, an item 802 indicating the name of paper, and an item 803 indicating the date and time when the relevant paper information was registered. In addition to the standard paper (paper type) pre-registered by the manufacturer at the time of product shipment, the user can register any paper types to be used by the user, as illustrated in the example in FIG. 8.

The pre-registered paper information includes paper types and target values. A combination of a paper type and a target value is hereinafter referred to as a calibration set. When calibration is executed on a registered paper type by using a relevant target value, a generated correction table is associated with the paper type. This correction table is updated each time calibration is executed.

The target value in this case is a predetermined value which is expected to be a value output from the image forming unit 210. Calibration is executed so that the value output from the image forming unit 210 coincides with the target value.

In the meantime, when the user presses the ADD PAPER TO BE REGISTERED button 804, the screen changes to a registration reception screen (not illustrated) allowing the user to register calibration paper information. The calibration paper information registered includes at least paper name information (paper type) and target information for the paper, and is stored in the HDD 208. The target information of paper refers to a value which is expected to be a value output from the image forming unit 210 at the time of calibration processing. Calibration is executed so that the value output from the image forming unit 210 coincides with the target value.

When calibration is executed on the paper type registered by the user by using the registered target value, a generated correction table is associated with the paper type. This correction table is updated each time calibration is executed.

The following describes calibration processing performed by the image processing apparatus 100 according to the present exemplary embodiment. Calibration processing can be roughly classified into two pieces of processing: calibration setting processing and calibration execution processing. The calibration setting processing can be performed at any timing regardless of the state of the image processing apparatus 100. The calibration execution processing requires processing for printing charts necessary for calibration and processing for updating parameter information necessary for the print processing. Therefore, the calibration execution processing cannot be executed during printing of a regular print job.

Figure 6:
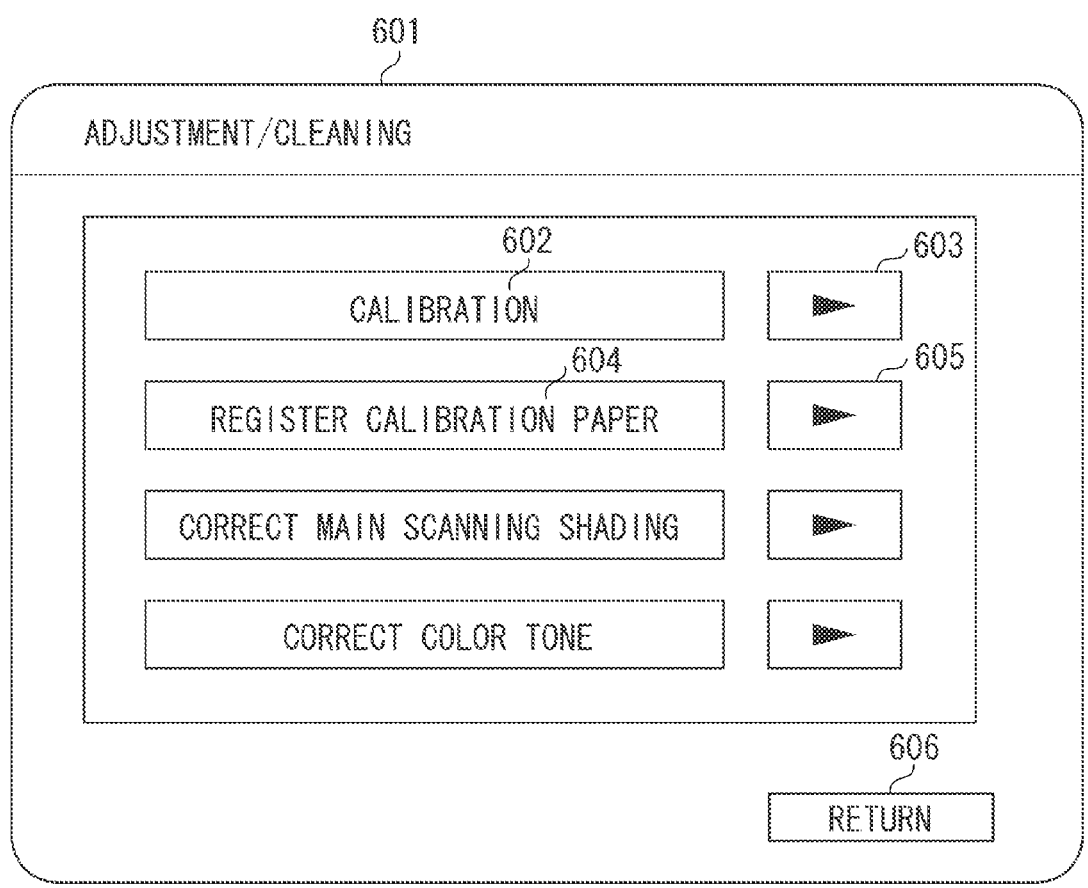
FIG. 6 illustrates a user interface (UI) of an adjustment/cleaning setting screen according to the first exemplary embodiment.

The calibration setting unit 506 is executed by the CPU 201. The calibration setting processing is performed based on information input by the user via the operation unit 204. FIG. 6 illustrates an example of a UI screen for proceeding to the CALIBRATION SETTING screen 901. This UI screen is displayed, for example, on an operation panel which is the operation unit 204 of the image processing apparatus 100. When the user presses an adjustment/cleaning setting button in the main menu screen (not illustrated) on the operation unit 204, the ADJUSTMENT/CLEANING setting screen 601 is displayed. The ADJUSTMENT/CLEANING setting screen 601 displays adjustment menu items, such as items 602 and 604 related to calibration. When the user presses the UI button 603 in this screen, the CPU 201 displays the CALIBRATION SETTING screen 901 on the operation unit 204. Further, the item 604 is used to register information about paper required to execute calibration. When the user presses the calibration paper registration button 605, the CPU 201 displays the CALIBRATION PAPER REGISTRATION screen 801 on the operation unit 204. When the presses a UI button (RETURN button) 606 on the ADJUSTMENT/CLEANING setting screen 601, the CPU 201 displays the main menu screen.

FIG. 9 illustrates an example of a UI screen for performing calibration setting according to the present exemplary embodiment. The CALIBRATION SETTING screen 901 presents information used as a basis for determining which calibration should be executed to the user, and receives calibration settings from the user. The information used as a basis for the determination refers to, for example, information about paper stored in each paper feed stage. A paper feed stage list 902 indicates the paper feed stages set in the sheet feed unit 212 of the image processing apparatus 100 at the time when the user operates this UI.

Figure 11:
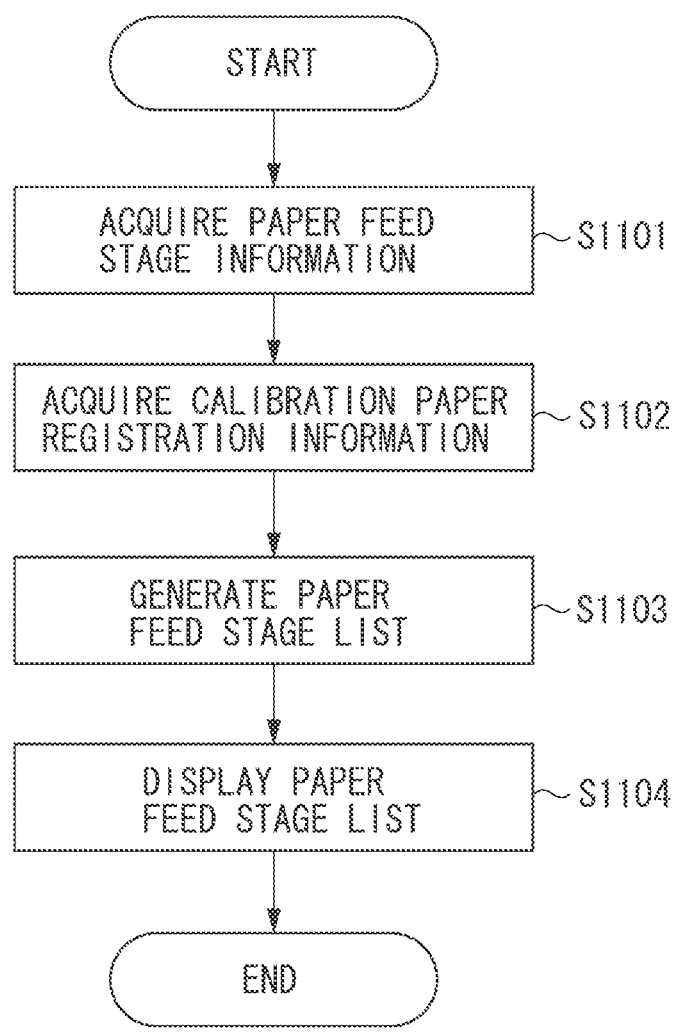
FIG. 11 is a flowchart illustrating processing for generating a paper feed stage list according to the first exemplary embodiment.

FIG. 11 is a flowchart illustrating processing for generating and displaying the paper feed stage list 902. A control program for this flowchart is stored in the ROM 206, and is loaded into the RAM 207 and executed by the CPU 201. The CPU 201 executes this processing at the timing when the CALIBRATION SETTING screen 901 is displayed. In step S1101, the CPU 201 acquires the paper feed stage information from the paper feed stage information acquisition unit 511. In step S1102, the CPU 201 acquires the calibration paper registration information from the calibration paper registration unit 509. In step S1103, the CPU 201 generates the paper feed stage list 902 based on the information acquired in steps S1101 and S1102. The information in the paper feed stage list 902 includes an item 903 indicating the name of each paper feed stage, an item 904 indicating the size and type of set paper, and an item 905 indicating whether the each paper is registered as calibration paper. In step S1104, the CPU 201 displays the paper feed stage list 902 generated in step S1103.

In the CALIBRATION SETTING screen 901, when the user selects any paper feed stage and then press the EXECUTE button 908, the CPU 201 executes calibration by using the paper set in the selected paper feed stage. The calibration execution is controlled by the calibration control unit 508. Calibration processing will be described below. When the user presses the CANCEL button 909, the CPU 201 cancels the calibration setting, and changes the screen to the main menu screen or the ADJUSTMENT/CLEANING setting screen 601. When the user presses the REGISTER PAPER button 907 for performing the above-described calibration paper registration, the CPU 201 changes the screen to the CALIBRATION PAPER REGISTRATION screen 801.

The following describes processing performed when the user presses the SELECT AUTOMATICALLY button 906, in which the present exemplary embodiment is characterized. FIG. 10 illustrates an example of a UI screen for executing calibration according to the present exemplary embodiment. When the user presses the SELECT AUTOMATICALLY button 906, the CPU 201 displays a CALIBRATION EXECUTION screen 1001 on the operation unit 204. The CPU 201 displays in the CALIBRATION EXECUTION screen 1001 a calibration execution list 1002 indicating a schedule of the calibration execution. The calibration execution list 1002 is a list of paper types enabling the generation of a correspondent correction table through the calibration execution. This list is generated by the calibration execution list generation unit 507.

Figure 12:
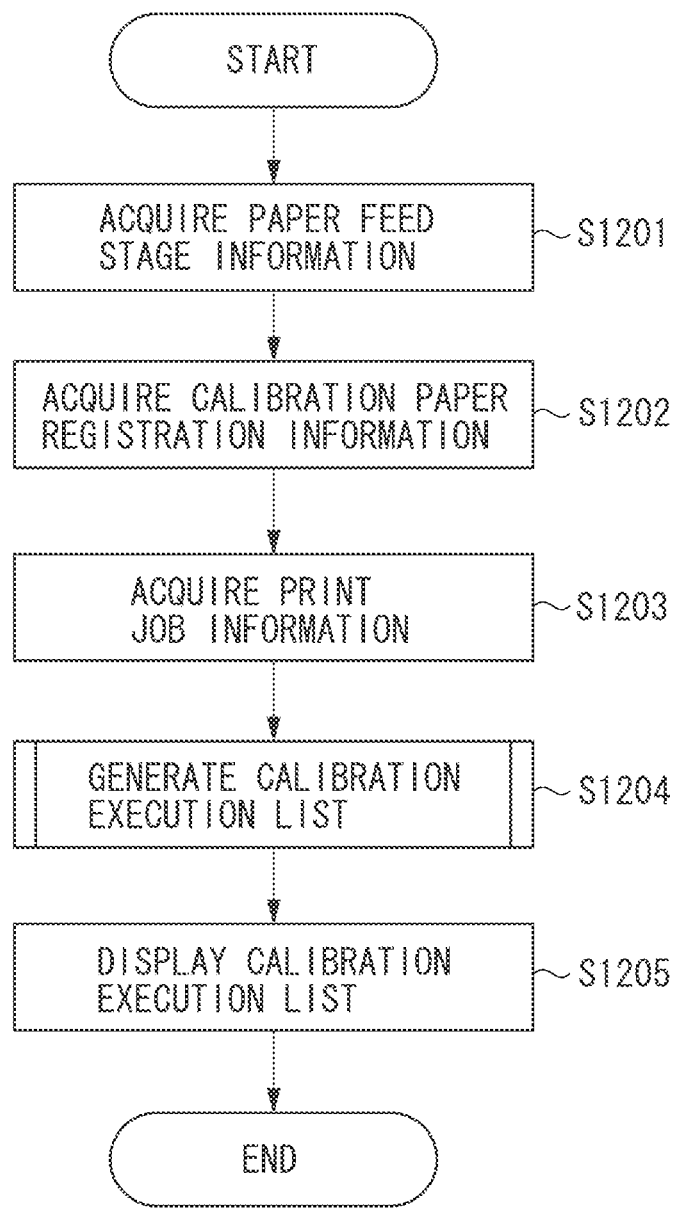
FIG. 12 is a flowchart illustrating processing for generating and displaying a calibration execution list according to the first exemplary embodiment.

FIG. 12 is a flowchart illustrating processing for generating and displaying the calibration execution list 1002 via the calibration execution list generation unit 507. A control program for this flowchart is stored in the ROM 206, and is loaded into the RAM 207 and executed by the CPU 201. This processing is executed at the timing when the CALIBRATION SETTING screen 901 is displayed. Processing in steps S1201 and S1202 is similar to processing in steps S1101 and S1102, respectively. In step S1201, the paper feed stage information acquisition unit 511 acquires the paper feed stage information. In step S1202, the calibration paper registration unit 509 acquires the calibration paper registration information. In step S1203, the print job information acquisition unit 406 acquires print job information. When the CPU 201 of the image processing apparatus 100 sends an inquiry to the CPU 301 of the print server 102, the CPU 301 acquires a print job list existing in the standby queue 405 via the print job information acquisition unit 406. The above-described print job information acquired includes at least the job number and paper information indicating a paper type specified to be used at the time of each job execution, out of information set in all of print jobs stored in the standby queue 405 in the HDD 306.

In step S1204, the CPU 201 generates the calibration execution list 1002 based on the paper feed stage information acquired in step S1201, the calibration paper registration information acquired in step S1202, and the print job information acquired in step S1203, by using a method described below. In step S1205, the CPU 201 displays the calibration execution list 1002 generated in step S1204.

Figure 13:
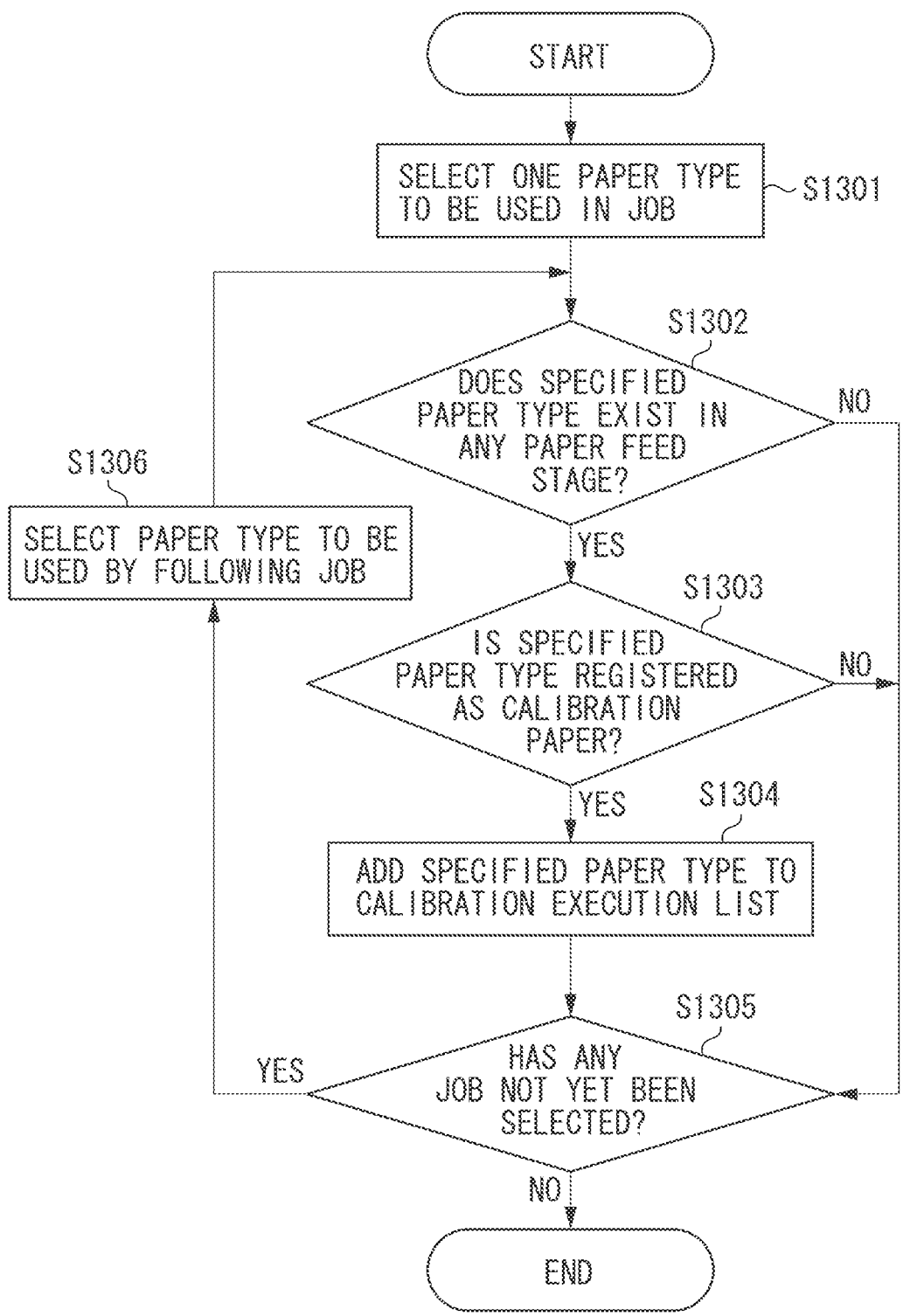
FIG. 13 is a flowchart illustrating processing for generating a calibration execution list according to the first exemplary embodiment.

FIG. 13 is a flowchart illustrating an example of processing for generating the calibration execution list 1002 in step S1204. A control program for this flowchart is stored in the ROM 206, and is loaded into the RAM 207 and executed by the CPU 201. In step S1301, based on the print job information, the CPU 201 selects a print job having the job number 1 which is to be executed first when printing is started, and acquires paper information indicating a paper type specified to be used at the time of the relevant job execution. In step S1302, the CPU 201 compares the selected paper type with the paper feed stage information to determine whether paper of the selected paper type exists in any one of the paper feed stages. When paper of the selected paper is determined to exist in any one of the paper feed stages (YES in step S1302), the processing proceeds to step S1303. Otherwise, when the selected paper is determined to not exist in the paper feed stages (NO in step S1302), the processing proceeds to step S1305. In step S1303, the CPU 201 compares paper of the selected paper type with the calibration paper registration information to determine whether the paper type specified to be used at the time of execution of the selected job is registered as calibration paper. When the selected paper type is determined to have been registered (YES in step S1303), the processing proceeds to step S1304. Otherwise, when the selected paper type is determined to have not been registered (NO in step S1303), the processing proceeds to step S1305. In step S1304, the CPU 201 appends the paper type specified to be used at the time of execution of the selected job to the calibration execution list 1002. The CPU 201 performs this processing because it determines that the paper type specified to be used at the time of execution of the selected job exists in any one of the paper feed stages, and that calibration can be executed when the relevant paper type is registered as calibration paper. In step S1305, the CPU 201 determines whether any job has not yet been selected from the print job information. When any job is determined to have not yet been selected (YES in step S1305), the processing proceeds to step S1306. In step S1306, the CPU 201 selects a paper type specified to be used at the time of execution of the job not having been selected out of standby print jobs, and the processing proceeds to step S1302. When all of standby print jobs are determined to have been processed for each paper type specified to be used at the time of job execution (NO in step S1305), the processing exits this flowchart. With the above-described processing, the CPU 201 selects all of paper types enabling the generation of a correspondent correction table through the calibration execution, and displays them in the calibration execution list 1002.

As illustrated in the calibration execution list 1002, when the user sequentially selects paper types specified to be used at the time of job execution in order from the job number 1, the CPU 201 generates a list of calibration execution for generating a correspondent correction table in order of paper types used in print jobs. If the user wants to change the execution order of calibration or if the user does not want to execute calibration for certain paper, the user can change the relevant setting by using buttons 1007 to 1009 at right. When the user presses the UP button 1007 with any paper type selected in the calibration execution list 1002, the selected paper type is moved up to the upper row. Likewise, when the user presses the DOWN button 1008, the selected paper type is moved down to the lower row. When the user presses the DELETE button 1009, the selected paper type is deleted from the calibration execution list 1002.

When the user presses an EXECUTE button 1010, the CPU 201 transmits the calibration execution list 1002 to the calibration control unit 508. The calibration control unit 508 sequentially executes calibration processing based on the received calibration execution list 1002. When the user presses a CANCEL button 1011, the CPU 201 changes the screen from the CALIBRATION EXECUTION screen 1001 to the CALIBRATION SETTING screen 901.

Figure 14:
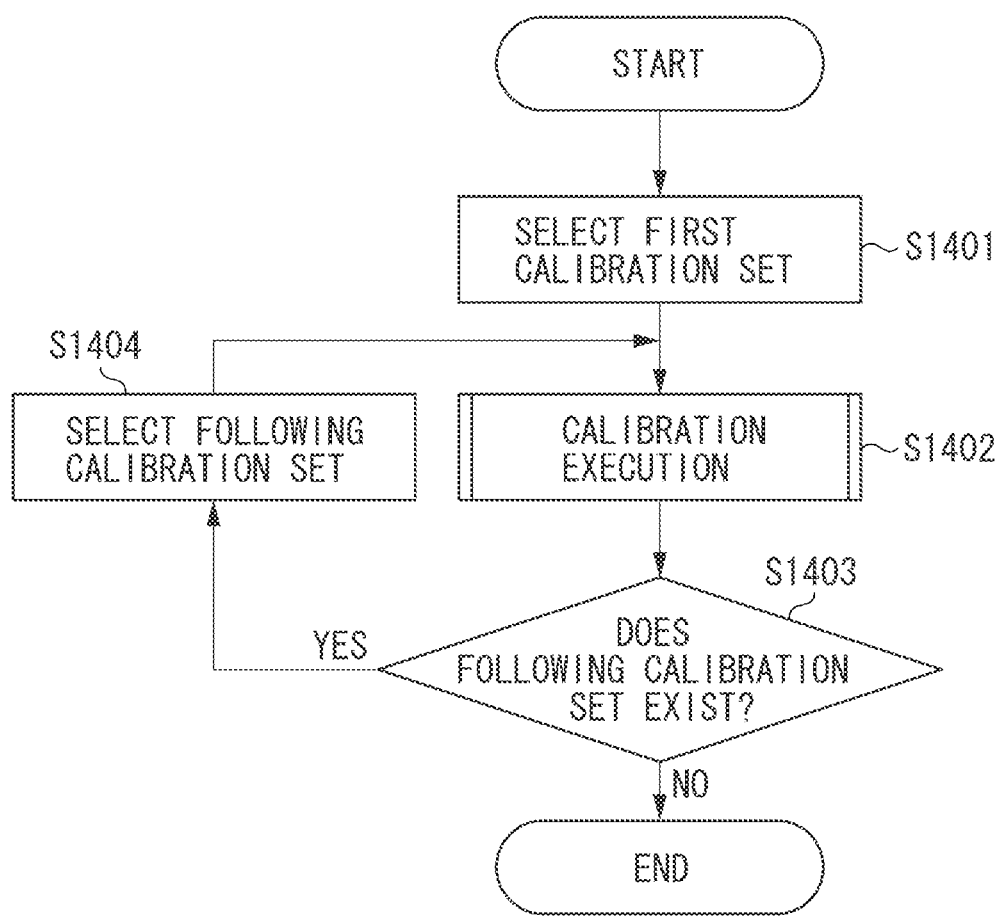
FIG. 14 is a flowchart illustrating processing for executing calibration according to the first exemplary embodiment.
Figure 15:
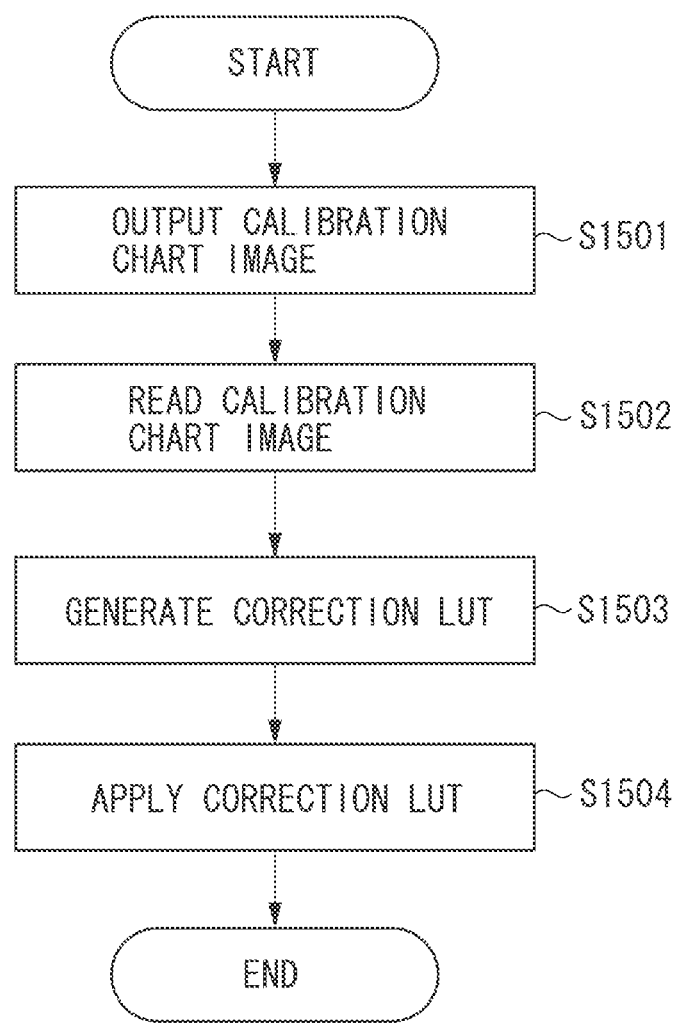
FIG. 15 is a flowchart illustrating procedures for executing calibration according to the first exemplary embodiment.
Figure 16A:
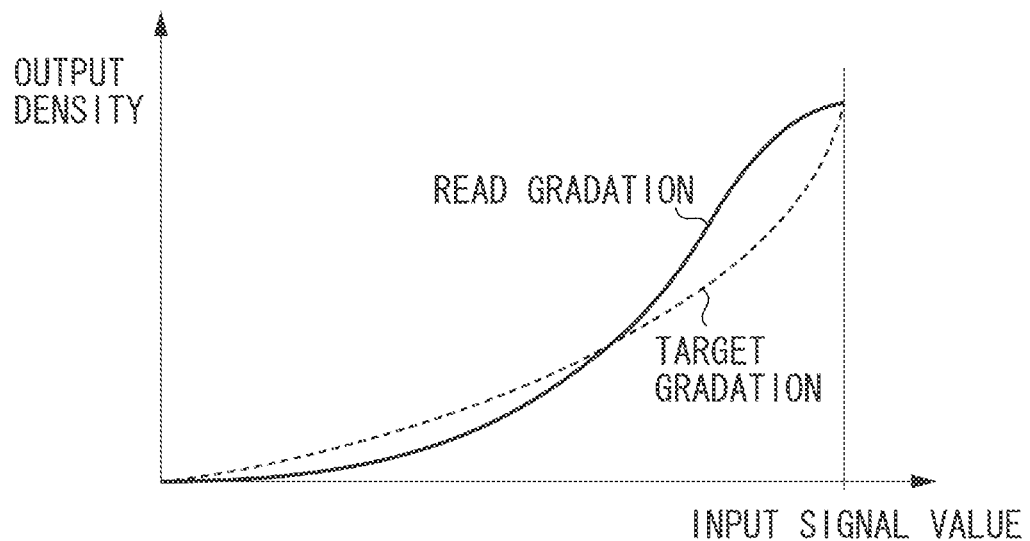
FIGS. 16A and 16B illustrate calibration processing according to the first exemplary embodiment.
Figure 16B:
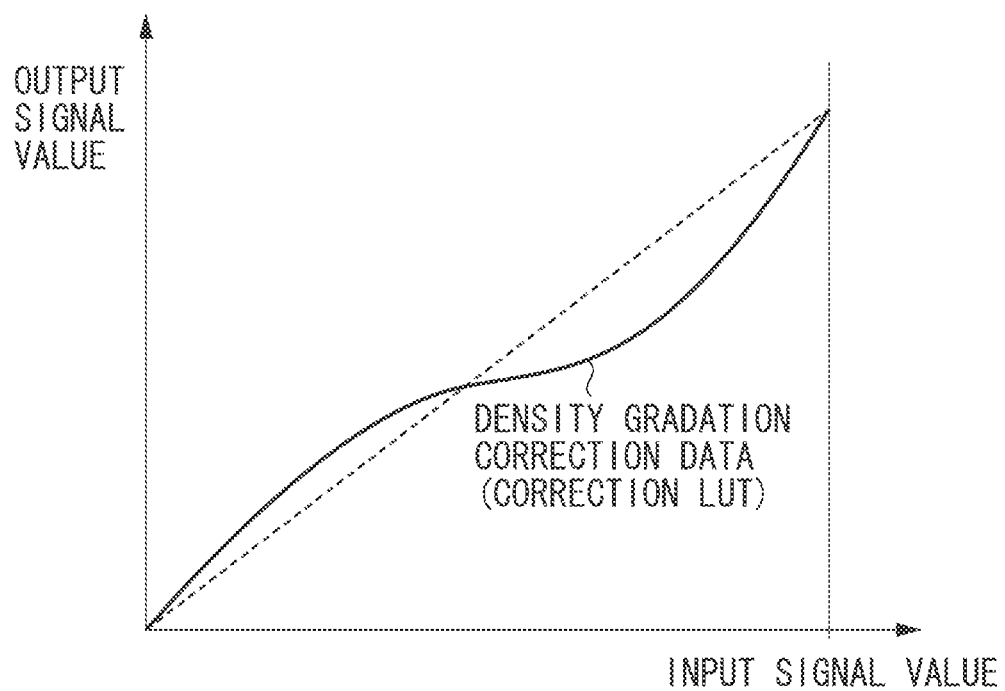

The following describes calibration execution processing with reference to FIG. 14 to FIGS. 16A and 16B. The calibration execution processing is executed by the calibration control unit 508. FIG. 16A is a graph illustrating a relation between gradation data to be corrected by calibration processing and target gradation. FIG. 16B is a graph illustrating a relation between the target gradation and correction data to be generated.

FIG. 14 is a flowchart illustrating an example of calibration execution processed by the calibration control unit 508.

A control program for this flowchart is stored in the ROM 206, and is loaded into the RAM 207 and executed by the CPU 201. This processing is executed when the user presses the EXECUTE button 908 in the CALIBRATION SETTING screen 901, or when the user presses the EXECUTE button 1010 in the CALIBRATION EXECUTION screen 1001. In step S1401, the CPU 201 selects the first calibration set stored in the calibration execution list 1002. In step S1402, the CPU 201 executes calibration processing (described below). In step S1403, the CPU 201 determines whether the following calibration set exists in the calibration execution list 1002. When the following set is determined to exist (YES in step S1403), then in step S1404, the CPU 201 selects the calibration set. Then, in step S1402, the CPU 201 executes calibration for the calibration set. When all of the calibration sets in the calibration execution list 1002 have been executed (NO in step S1403), the processing exits this flowchart (the calibration execution processing ends). The print job is executed after completion of generation of a correction table corresponding to each paper type set in each print job included in the print job list in this way, i.e., after completion of the calibration execution.

FIG. 15 is a flowchart illustrating an example of processing for the calibration execution in step S1402. A control program for this flowchart is stored in the ROM 206, and is loaded into the RAM 207 and executed by the CPU 201. In step S1501, the CPU 201 prints out a calibration chart image. Calibration chart image data is prestored in the HDD 208. A calibration chart image is formed based on this data, and is printed on paper. Generally, a calibration chart image is formed of the necessary number of patch images arranged to generate reproduction characteristics data for the printer unit 209. In step S1502, the CPU 201 loads the calibration chart image. The image processing apparatus 100 according to the present exemplary embodiment includes the measurement unit 214 in the printer unit 209. The measurement unit 214 includes the sensor 215 disposed on the paper conveyance path between the fixing unit and the sheet discharge unit 213. The sensor 215 refers to, for example, a measurement sensor capable of reading the density and chromaticity of patch images printed on paper. The sensor 215 sequentially reads the printed patch images one by one to generate reproduction characteristics data. Gradation characteristics data, one of reproduction characteristics data, refers to, for example, the read gradation data illustrated in FIG. 16A, and is generated as a LUT for associating the input signal value with the output density. In step S1503, the CPU 201 generates correction data.

When the reproduction characteristics data is gradation characteristics data, the correction data refers to, for example, the density gradation correction data (correction LUT) illustrated in FIG. 16B. The relation between FIG. 16B and FIG. 16A is indicated by an LUT for converting the input signal value into the output signal value so that the read gradation (reproduction characteristics) coincides with the target value. In step S1504, the CPU 201 stores the generated correction LUT in the HDD 208, and the processing exits the flowchart.

Data of the correction LUT is stored for each paper type (calibration set). When the CPU 201 executes a print job, the CPU 201 selects a correction LUT based on the paper information set for the print job. Then, the calibration correction application unit 503 utilizes the correction LUT to apply correction to the print job to be output.

Although, in the present exemplary embodiment, calibration for correcting the gradation characteristics has specifically been described, calibration is not limited thereto. The color reproduction characteristics represented by mixed-color may be corrected. Mixed-color means a color produced by a plurality of toners. For example, the red, green, and blue colors are respectively produced by using two out of the C, M, and Y colors. The gray color is produced by using the C, M, and Y colors. When correcting the monochromatic gradation characteristics, the CPU 201 uses a one-dimensional LUT as a target value. However, when correcting the color characteristics with mixed-color, the CPU 201 uses a multi-dimensional LUT as a target value.

Thus, in the present exemplary embodiment, at the time of calibration execution, the CPU 201 can acquire information about a paper type to be used for execution of an input print job, and execute calibration on the paper type requiring the generation of a correction LUT.

Thus, before execution of a print job, the CPU 201 can selectively execute calibration on each paper type requiring the generation of a correction LUT. This enables reducing useless consumption at the time of calibration execution.

The CPU 201 presents calibration to be selectively executed to the user, allowing the user to further determine whether calibration is to be executed or not and the execution order of calibration. Thus, even if the user does not have in-depth knowledge of calibration, the user can easily operate calibration which needs to be executed.

In the first exemplary embodiment, the CPU 201 extracts only paper types stored in the paper feed stages, having a registered target value, out of paper types specified to be used for execution of print jobs, executes calibration, generates the calibration execution list 1002, and displays it on the UI screen 1001.

In a second exemplary embodiment, it is considered that the CPU 201 presents paper types not enabling the calibration execution out of paper types specified to be used for execution of print jobs to the user.

FIG. 17 illustrates a UI of an example of a list of paper types not enabling the calibration execution and the generation of a correspondent correction table according to the second exemplary embodiment. This UI is processed by the CPU 201, and displayed, for example, on the CALIBRATION EXECUTION screen 1001. Alternatively, it is also possible to arrange a warning message and a button in the CALIBRATION EXECUTION screen 1001, and, when the user presses the button, display the UI as another screen. The UI includes an item 1701 indicating the job number, and an item 1702 indicating paper information set in each job. The UI further includes an item 1703 indicating information about each paper feed stage in which the relevant paper is set. If the relevant paper is set (stored) in none of the paper feed stages, a message, such as "UNSET", is displayed to notify the relevant condition. The UI further includes an item 1704 indicating information about whether the relevant paper is registered as calibration paper. If no paper is registered as registration paper, a message, such as "UNREGISTERED", is displayed to notify the relevant condition. An item 1705 indicates message information to be presented to the user, which indicates an action required to be performed next to enable the calibration execution.

According to the second exemplary embodiment, the CPU 201 can present paper types not enabling the execution of calibration for generating a correction table at present.

Accordingly, out of print jobs subjected to printing stored in the standby queue 405, the user can easily identify paper types not involving the generation of a correction table, and possibly not subjected to suitable correction on a print product to be output. By notifying the user of paper types not involving the generation of a suitable correction table before execution of a print job in this way, it becomes possible to prevent output of a low-image-quality print product not involving the suitable generation of a correction table, and not subjected to suitable correction.

In a third exemplary embodiment, conditions for determining the order of selection and execution of calibration sets in the calibration execution list 1002. Further, in the third exemplary embodiment, the CPU 201 sets an effective period to calibration sets.

Figure 18:
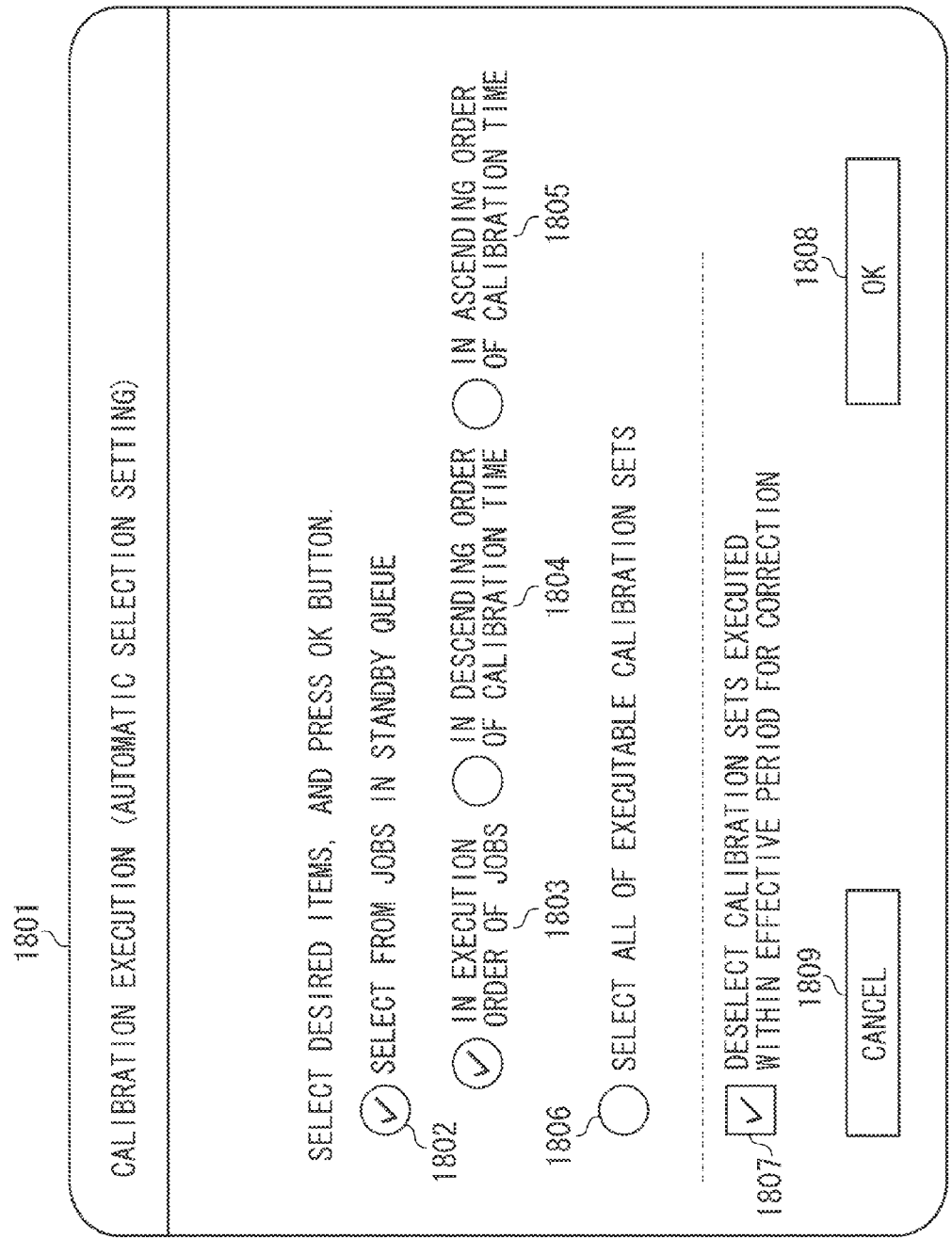
FIG. 18 illustrates a UI of a calibration automatic selection setting screen according to a third exemplary embodiment.

FIG. 18 illustrates a UI of an example of a CALIBRATION EXECUTION (AUTOMATIC SELECTION SETTING) screen 1801 according to the third exemplary embodiment. This UI is processed by the CPU 201 via the calibration execution list generation unit 507. When the user presses the SELECT AUTOMATICALLY button 906 in the CALIBRATION SETTING screen 901, the CALIBRATION EXECUTION (AUTOMATIC SELECTION SETTING) screen 1801 is displayed on the operation unit 204.

The following describes two different methods for selecting paper types involving the generation of a correspondent correction table.

The first method is to select paper types from print jobs in the standby queue 405 described in the first exemplary embodiment. The second method is to select paper types enabling execution of calibration for generating a correspondent correction table (the second method is to generate a correction table for paper types having a target value) regardless of print jobs in the standby queue 405. A check box 1802 is used to specify selection of paper types from print jobs in the standby queue 405. Check boxes 1803 to 1805 are used to specify conditions for determining the execution order of calibration on the selected paper types. A check box 1803 is used to specify generation of the calibration execution list 1002 in execution order of print jobs stored in the standby queue 405. A check box 1804 is used to specify generation of the calibration execution list 1002 in descending order of the calibration execution time (time taken for the calibration execution), i.e., starting with a calibration set requiring the longest time of calibration processing. A check box 1805 is used to specify generation of the calibration execution list 1002 in ascending order of the calibration execution time, i.e., starting with a calibration set requiring the shortest time of calibration processing. A check box 1806 is used to specify selection of all of executable calibration sets regardless of whether a print job exists in the standby queue 405. The calibration execution list 1002 is generated according to the check boxes pressed by the user, and calibration is executed based on the generated list.

The following describes the calibration time. The calibration time differs according to the printing performance of the image forming unit 210 of the image processing apparatus 100, and depends on the type of the target paper (paper type). Generally, printing on paper having a larger grammage (paper type classification) takes a longer time. The calibration time also depends on the number of calibration chart image sheets output in step S1501 in calibration processing.

When reading patch images formed on a printed chart image by using the sensor 215 in the measurement unit 214 of the printer unit 209 in step S1502, a chart image printed on paper having a large grammage will be heated to high temperature after fixing. Therefore, to lower the paper temperature before measurement, it is necessary to provide a wait time between fixing and measurement by the sensor 215. This measures is taken to cope with the change in tint and density of the patch images due to the paper temperature, which is generally referred to as thermochromism phenomenon. If the sensor 215 reads density information of the patch images on the chart image printed on paper at high temperature, the read density will be different from the density as a result of measuring patch images on a chart image printed on paper at the room temperature. Thus, the accuracy of correction applied to a print product will decrease. To avoid this, after printing and fixing on paper having a large grammage, the CPU 201 waits for a while or reduces the conveyance speed during conveyance inside the engine until the paper temperature falls to the room temperature, and then starts measurement via the sensor 215.

Calibration for generating a correction table corresponding to a paper type requiring measures for preventing the influence of thermochromism may take an extremely longer time than calibration on a paper type not requiring consideration of the influence of thermochromism.

Information about calibration time for generating a correction table corresponding to paper types requiring measures for preventing the influence of thermochromism is prestored in the HDD 208. In the present exemplary embodiment, the calibration paper registration unit 509 determines the calibration time stored in the HDD 208 based on registered paper types, and stores the calibration time in an associated way as one piece of the calibration paper registration information.

Further, the third exemplary embodiment sets information about an effective period for correction for each paper type, considers provision of an effective period for calibration. When the user inputs any time duration as an effective period for calibration on a UI (not illustrated), effective period information is set. When the user checks a check box 1807, a paper type determined to have undergone the calibration execution within the effective period will not be appended to the calibration execution list 1002. Specifically, the CPU 201 does not execute calibration for generating a correction table corresponding to the relevant paper type. This is because, within the effective period, the image characteristics of the image forming unit 210 do not change so much and therefore re-execution of calibration is thought to be unnecessary. Successively using the last generated correction table (correction result) enables preventing redundant calibration execution. When the user presses an OK button 1808, the CPU 201 generates the calibration execution list 1002 based on set conditions, changes the screen to the CALIBRATION EXECUTION screen 1001, and displays the calibration execution list 1002. Then, based on the generated calibration execution list 1002, the CPU 201 determines the execution order of calibration by the calibration control unit 508. In steps S1401 and S1404, in the determined calibration order, the CPU 201 selects a paper type involving the generation of a correspondent correction table, and a registered value defined for the paper type. When the user presses the CANCEL button 1809, the CPU 201 cancels the processing and then changes the screen to the CALIBRATION SETTING screen 901 or the main menu screen.

FIG. 19 illustrates an example of a UI indicating the calibration paper registration information according to the third exemplary embodiment. This UI is processed by the CPU 201 via the calibration paper registration unit 509, and then displayed on the CALIBRATION PAPER REGISTRATION screen 801. The UI includes an item 1901 indicating the name of paper (paper type), and an item 1902 indicating the date and time when the paper was registered, which are equivalent to the items 802 and 803, respectively. The UI further includes an item 1903 indicating the date and time when calibration was executed last (a correction table was generated). The UI further includes an item 1904 indicating the reference time duration required to execute calibration. These pieces of information are stored in the HDD 208 as the calibration paper registration information.

Figure 20:
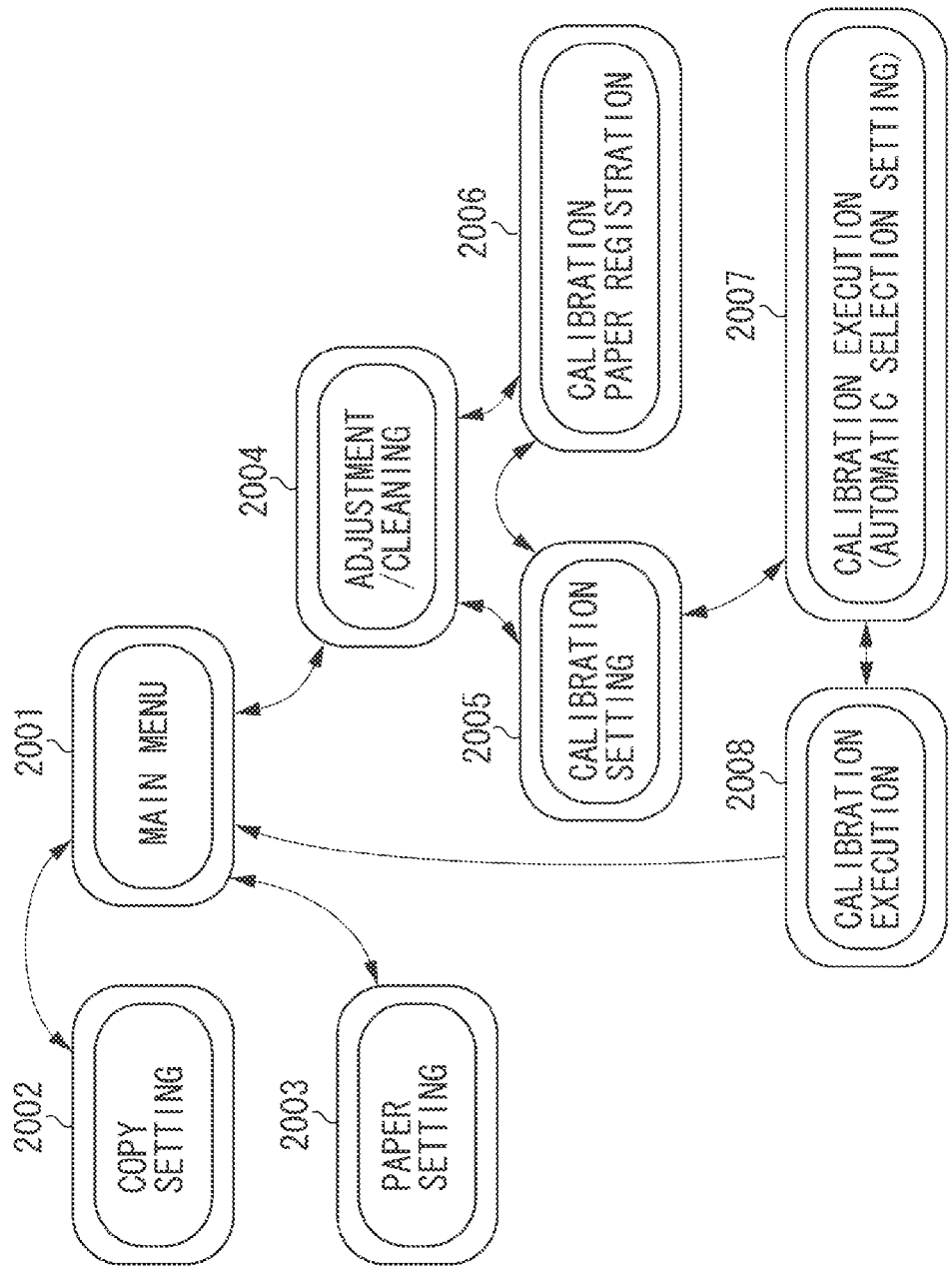
FIG. 20 illustrates UI screen transition according to the third exemplary embodiment.

The following describes the transition of UI screens displayed on the operation unit 204 of the image processing apparatus 100 according to the third exemplary embodiment, with reference to FIG. 20. Data of the UI screens is stored in the ROM 206, read by the CPU 201, and displayed on the operation unit 204. A UI screen 2001 is a main menu screen (not illustrated). All of operations to be made on the image processing apparatus 100 can be activated from the main menu screen 2001. A UI screen 2002 is a copy setting screen (not illustrated). Scan and send setting screens (not illustrated) may exist in FIG. 20. A UI screen 2003 is a paper setting screen. When the user presses a paper setting button in the main menu screen 2001, the CPU 201 displays the PAPER SETTING screen 701. When the user presses an adjustment/cleaning button in the main menu, the CPU 201 displays an adjustment/cleaning screen 2004, for example, the ADJUSTMENT/CLEANING setting screen 601 on the operation unit 204. The adjustment/cleaning screen 2004 displays selection items for the adjustment function of the image processing apparatus 100, such as items for calibration setting and calibration paper registration. A UI screen 2005 is a calibration setting screen. When the user presses the UI button 603 in the adjustment/cleaning screen 2004, the CPU 201 displays the CALIBRATION SETTING screen 901 on the operation unit 204. A UI screen 2006 is a calibration paper registration screen. When the user presses the calibration paper registration button 605 in the ADJUSTMENT/CLEANING setting screen 601 or the REGISTER PAPER button 907 in the CALIBRATION SETTING screen 901, the CPU 201 displays the CALIBRATION PAPER REGISTRATION screen 801 on the operation unit 204. A UI screen 2007 is a calibration execution (automatic selection setting) screen 2007. When the user presses the SELECT AUTOMATICALLY button 906 in the CALIBRATION SETTING screen 901, the CPU 201 displays the CALIBRATION EXECUTION (AUTOMATIC SELECTION SETTING) screen 1801 for setting conditions for generating the calibration execution list 1002 on the operation unit 204. A UI screen 2008 is a calibration execution screen. When the user presses the OK button 1808 in the CALIBRATION EXECUTION (AUTOMATIC SELECTION SETTING) screen 1801, the CPU 201 displays the CALIBRATION EXECUTION screen 1001 on the operation unit 204. The CPU 201 displays the calibration execution list 1002 generated according to each condition. When the user presses the EXECUTE button 1010, the CPU 201 executes calibration processing, and displays the main menu screen 2001 on the operation unit 204.

According to the third exemplary embodiment, after calibration execution, the CPU 201 can generate the calibration execution list 1002 in consideration of selection of paper types involving the generation of a correspondent correction table and the execution order of calibration. Thus, it becomes possible to freely generate the calibration execution list 1002 according to user's preferences simply by selecting specific conditions. It is also possible to set an effective period for calibration, and change conditions not to include in the calibration execution list 1002 paper types having undergone the generation of a correspondent correction table through the calibration execution within the effective period.

Specifically, it becomes possible to perform control not to execute unnecessary calibration.

A fourth exemplary embodiment enables setting a timing of executing calibration for generating a correction table to paper types in the generated calibration execution list 1002.

In the above-described exemplary embodiments, it is possible to continuously execute calibration for generating a correction table corresponding to each of a plurality of paper types. However, a situation can be assumed where there is a paper type not requiring the generation of a correspondent correction table by immediately executing calibration. For example, a situation is assumed where the user wants to execute calibration only on a print job required to be urgently printed, and, after completion of printing of the relevant print job, to execute calibration and printing on the remaining print jobs.

FIG. 21 illustrates a UI of an example of the calibration execution list 1002 according to the fourth exemplary embodiment. This UI is processed by the CPU 201 via the calibration execution list generation unit 507, and is displayed on the calibration execution list 1002. Items 2101 to 2104 are similar to items 1003 to 1006, respectively, and redundant descriptions thereof will be omitted.

The UI includes an item 2105 indicating the timing of calibration execution for each paper type.

Two different timings of calibration execution can be set. The first timing is a timing 2106. Calibration is executed after the EXECUTE button 1010 is pressed before the first print job is started. The second timing is a timing 2107. Calibration is executed during print job execution, i.e., immediately before execution of a print job for which a paper type specified in a calibration set is specified to be used.

When the user selects any calibration set and selects an item 2106 (PROMPTLY) or an item 2107 (IMMEDIATELY BEFORE JOB) in the EXECUTION TIMING column 2105 in the CALIBRATION EXECUTION screen 1001, the CPU 201 sets the execution timing.

For a paper type for which "PROMPTLY" is selected, when the user presses the EXECUTE button 1010, the CPU 201 starts the calibration execution before executing the print job to be executed first out of input print jobs. In this calibration, the CPU 201 transmits an execution instruction to the calibration control unit 508, and calibration is executed in the order specified in the calibration execution list 1002.

For a paper type for which "IMMEDIATELY BEFORE JOB" is selected, the CPU 201 temporarily stores the paper type via the calibration setting unit 506.

When the print data receiving unit 501 receives print data, the CPU 201 compares the received print job number with the job number for the paper type temporarily stored. When the two job numbers coincide with each other, the CPU 201 interrupts the print processing of the print job, transmits the relevant paper type to the calibration control unit 508, and executes calibration.

Specifically, the CPU 201 executes calibration during execution of input print jobs. Immediately before execution of a print job by using a specified paper type, the CPU 201 executes calibration for generating a correction table for the same paper type as the one to be used in the relevant print job.

According to the fourth exemplary embodiment, it is possible to select an execution timing of calibration for generating a correspondent correction table for each paper type. Thus, the CPU 201 can flexibly set a timing of calibration execution depending on the user's printing situation. By presetting a calibration execution timing for all of paper types in this way, accurate calibration processing at a suitable timing can be achieved even if the user does not stay around the image processing apparatus 100.

Although the above-described exemplary embodiments have specifically been described based on an electrophotographic apparatus, the image processing apparatus is not limited thereto, and may be an ink jet printer and a thermal printer. The spirit of the present invention is not limited to the printer type. Although the above-described exemplary embodiments have specifically been described based on the use of toner in electrophotographic printing as a recording agent, the recording agent used for printing is not limited to toner, and may be other recording agents, such as ink. The spirit of the present invention is not limited to the recording agent type.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-278322 filed Dec. 20, 2012, which is hereby incorporated by reference herein in its entirety.

What is claimed is:

1. An image processing apparatus comprising:
   an acquisition unit configured to acquire a paper type to be used at the time of execution of an input print job;
   a determination unit configured to determine a paper type to be used for executing the input print job by using information about the paper type acquired by the acquisition unit; and
   a generation unit configured to generate a correction table corresponding to the paper type determined by the determination unit, the correction table being used to correct an image that is formed by an image forming unit by using a value obtained as a result of measuring a patch formed by the image forming unit on paper of the paper type determined by the determination unit wherein the generation unit acquires an order of execution of print jobs from print job information acquired by a print job information acquisition unit, and generates correction tables corresponding to paper types in the order of execution of print jobs.

2. The image processing apparatus according to claim 1, further comprising a display unit configured to display a calibration execution list indicating paper types for which correction tables are generated by the generation unit.

3. The image processing apparatus according to claim 1, further comprising a registration unit configured to register a target value for each paper type, the target value being used in correcting the image that is formed by the image forming unit, wherein, when a target value corresponding to the paper type determined by the determination unit is not registered, a correction table is not generated by the generation unit.

4. The image processing apparatus according to claim 1, further comprising a unit configured to determine an order of generation of correction tables to be generated by the generation unit.

5. The image processing apparatus according to claim 1, further comprising an effective period information setting unit configured to set information about an effective period for the correction table generated by the generation unit, wherein, for a paper type for which a correction table is generated within the effective period set by the effective period information setting unit, a new correction table is not generated by the generation unit.

6. The image processing apparatus according to claim 1, wherein the generation unit determines an order of generation of correction tables based on a time duration required to generate a correction table corresponding to each paper type.

7. The image processing apparatus according to claim 1, wherein, when the generation unit generates a correction table, a measurement unit disposed on a paper conveyance path between a fixing unit and a sheet discharge unit measures a chart formed by using the paper type to be used for executing the input print job.

8. A method of controlling an image processing apparatus having an image forming unit comprising:
  acquiring a paper type to be used at the time of execution of an input print job;
  determining a paper type to be used for executing the input print job by using information about the acquired paper type;
  acquiring an order of execution of print jobs; and
  generating a correction table corresponding to the determined paper type, the correction table being used to correct an image that is formed by the image forming unit by using a value obtained as a result of measuring a patch formed by the image forming unit on paper of the determined paper type,
  wherein the correction table corresponding to the determined paper type is generated in the acquired order of execution of print jobs.

9. A non-transitory computer-readable storage medium storing a program that causes a computer to execute the image processing method according to claim 8.

* * * * *